Figure 1:
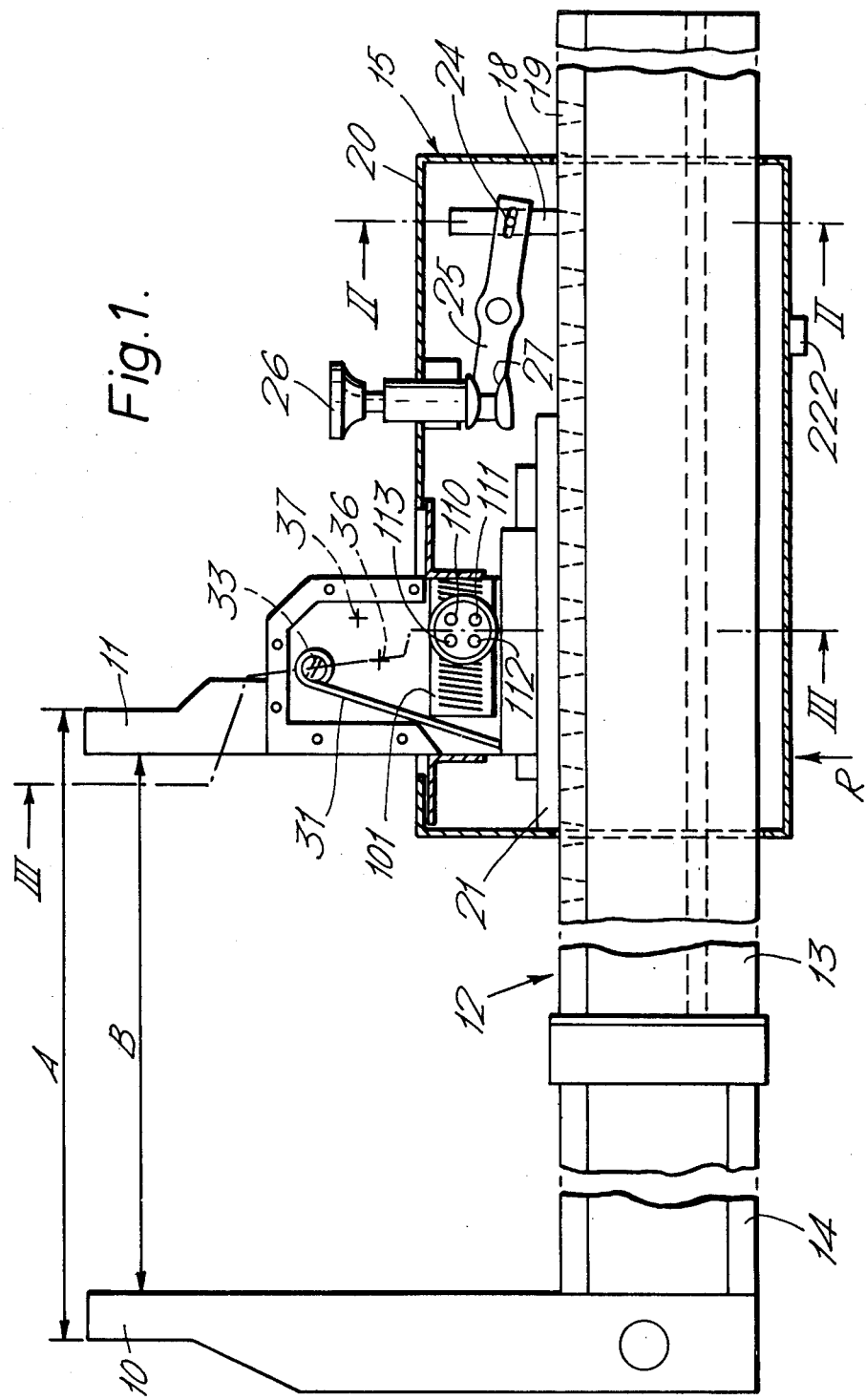

United States Patent [19]

Amsbury et al.

[11] 4,063,362
[45] Dec. 20, 1977

[54] MEASURING INSTRUMENT

[75] Inventors: Clifford Roy Amsbury, King's Newton; Eric Warren, Etwall, both of England

[73] Assignee: Rolls-Royce Limited, London, England

[21] Appl. No.: 671,490

[22] Filed: Mar. 29, 1976

[30] Foreign Application Priority Data

Apr. 3, 1975 United Kingdom ............... 13587/75

[51] Int. Cl.² ........................... G01B 3/20; G01B 7/02
[52] U.S. Cl. ................. 33/147 J; 33/125 C; 33/147 N
[58] Field of Search ............ 33/125 C, 143 M, 143 J, 33/143 K, 143 L, 147 F, 147 H, 147 T, 147 J, 147 K, 147 N, 161, 165, 172 E

[56] References Cited

U.S. PATENT DOCUMENTS

| 1,288,034 | 12/1918 | Kirchner | 33/147 J |
| 1,526,305 | 2/1925 | Neumaier | 33/143 K |
| 1,596,618 | 8/1926 | Morrill | 33/143 J |
| 2,741,848 | 4/1956 | Livingston | 33/167 |
| 3,878,984 | 4/1975 | Sotiropoulos et al. | 33/172 E |
| 3,996,669 | 12/1976 | Anichini | 33/147 N |

FOREIGN PATENT DOCUMENTS

| 2,357,837 | 7/1974 | Germany | 33/143 L |
| 110,129 | 8/1924 | Switzerland | 33/143 M |
| 135,651 | 12/1919 | United Kingdom | 33/143 K |
| 1,062,834 | 3/1967 | United Kingdom | 33/165 |

Primary Examiner—Richard E. Aegerter
Assistant Examiner—Richard R. Stearns
Attorney, Agent, or Firm—Cushman, Darby & Cushman

[57] ABSTRACT

A measuring instrument of the caliper type which can be extended out, by means of extension pieces, to cover a wide range of linear dimensions. A mechanical scale gives the most significant figures of the measurement and the scale indicates a different range to match each extension piece employed. An electrical circuit gives the least significant figures of the measurement and the figures are presented together so that they can be read as a composite reading.

8 Claims, 8 Drawing Figures

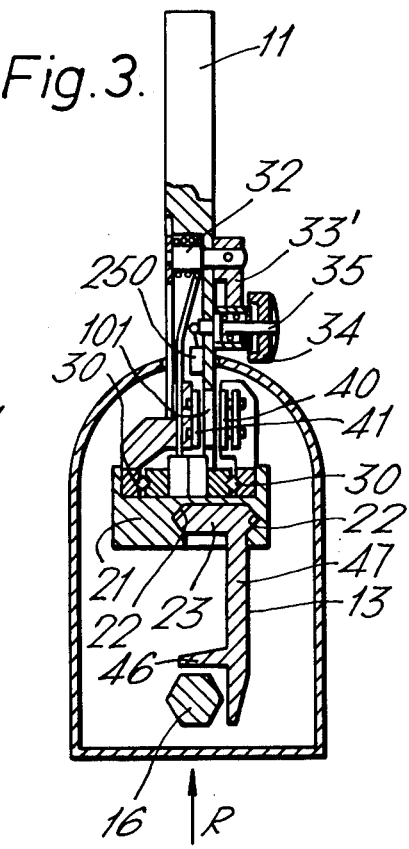
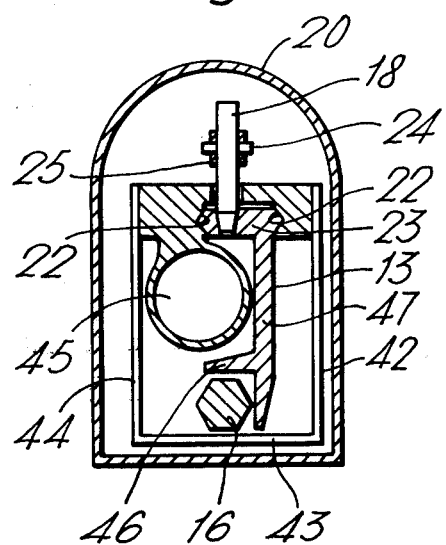
Fig. 3.
Fig. 2.
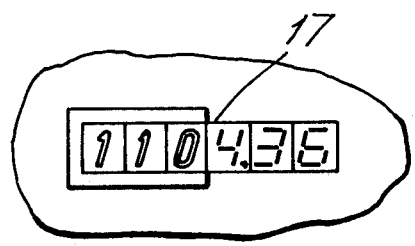
Fig. 4.

MEASURING INSTRUMENT

In engineering workshops it is often required to take accurate measurements of dimensions in excess of about 25 cm (1 foot). Plenty of instruments exist which can be used to take accurate measurements of dimensions less than about 25 cm but existing instruments for measuring these larger dimensions are often cumbersome. Also, such instruments as are available are often liable to inaccuracies due to the effect of temperature variations in the working environment. They usually include a long bar of metal which is sensitive to the heat it receives from the environment and even from the operator's hands and when very accurate measurements are required the variations caused by these effects are often greater than the apparent accuracy of the measurement.

Also, measuring instruments of this type can give different readings depending upon the amount of pressure used by the operator in taking a reading. The present invention is intended to provide an instrument in which accurate measurements down to hundredths of millimeters can be taken for dimensions over about 25 cm in which temperature and handling pressures do not affect the accuracy of measurement or its repeatability.

According to the present invention there is provided an instrument for measuring linear dimensions comprising a pair of anvils for contacting a workpiece across a dimension to be measured, a longitudinal bar extending the length of the instrument, a first of said anvils being secured to the bar, a carriage movable along the bar and adapted to be positioned at any one of a series of equally spaced positions along the bar, said positions corresponding to units of measurement relative to the first anvil, and the second of said anvils being mounted on the carriage for movement parallel to the longitudinal length of said bar over a distance of at least one of said units.

Preferably, there is provided first means for indicating the position of the carriage relative to said first anvil and second means for indicating the position of the second anvil relative to the carriage, both said indications being in said units of measurement whereby to indicate the dimension to be measured in the form of a composite indication.

It is also preferred that the second anvil shall be biassed, as by spring pressure, alternatively towards one end or towards the other end of its movement relative to the carriage and that the operator can select the direction of this bias depending on whether he wishes to measure an inside or an outside dimension.

Figure 5:
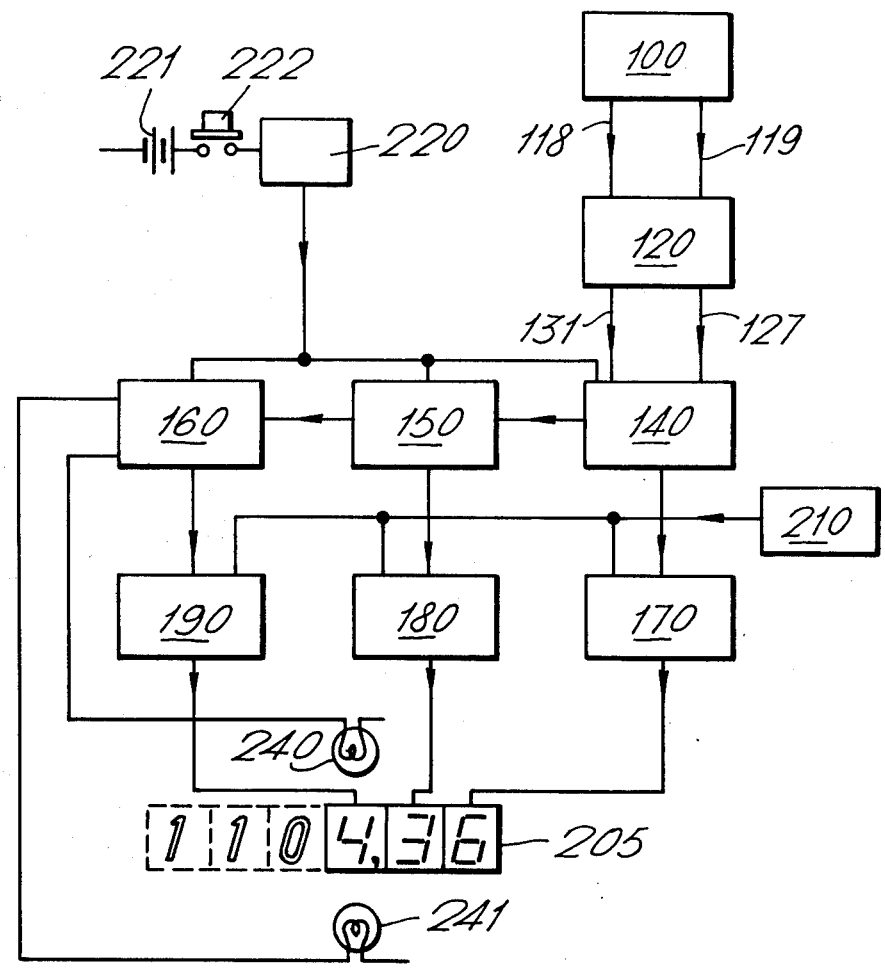
Figure 6A:
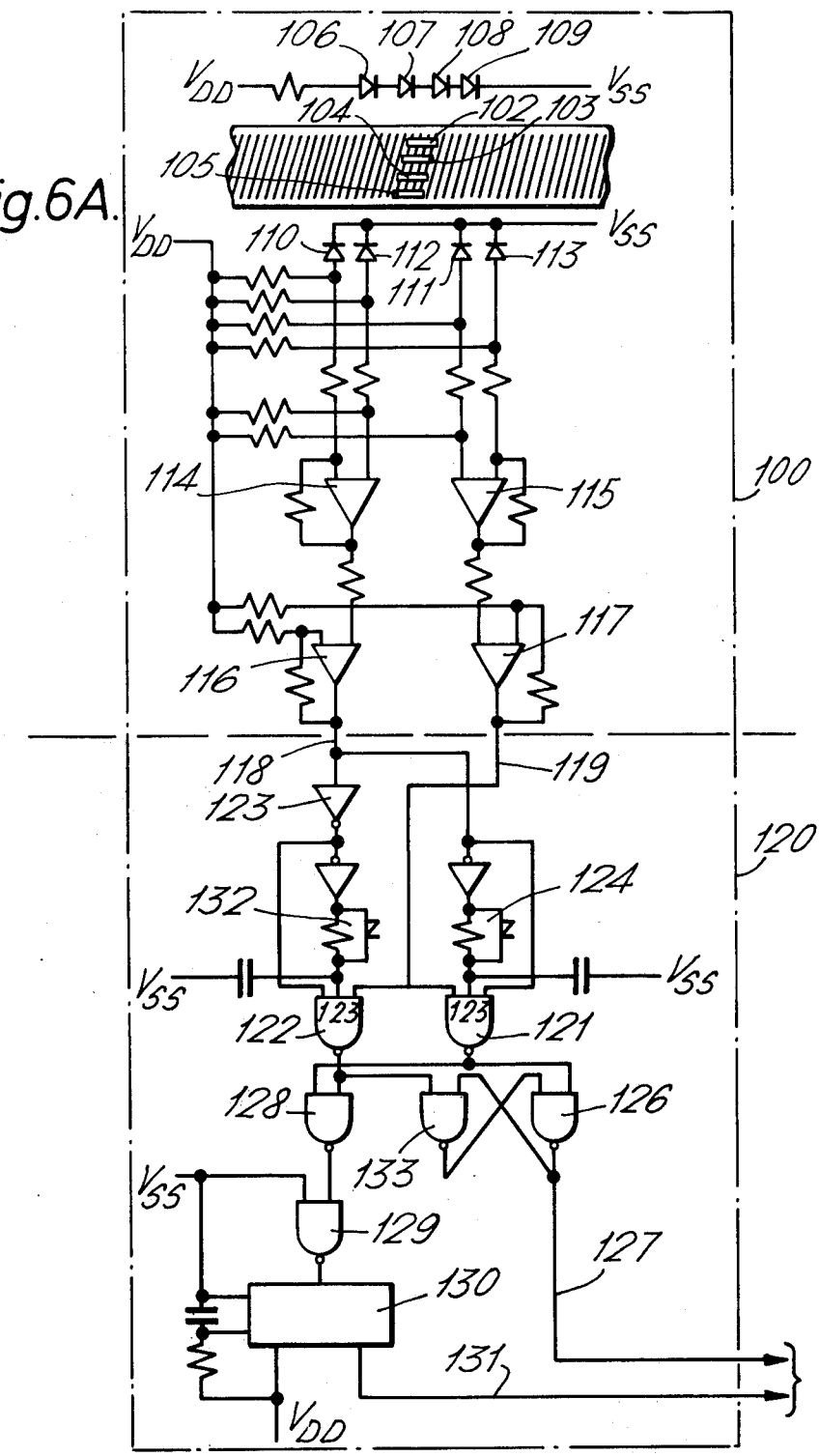
Figure 6B:
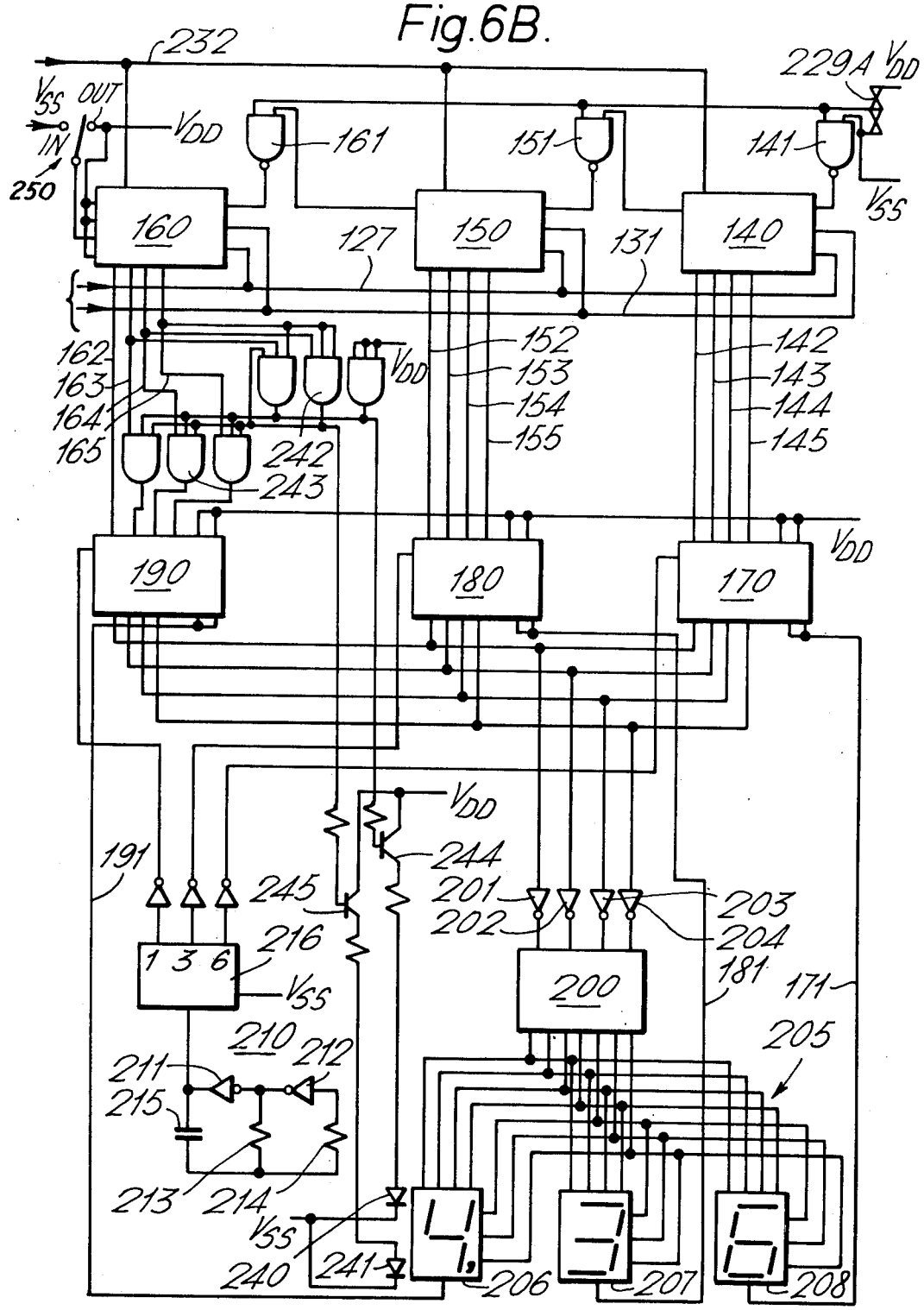
Figure 6C:
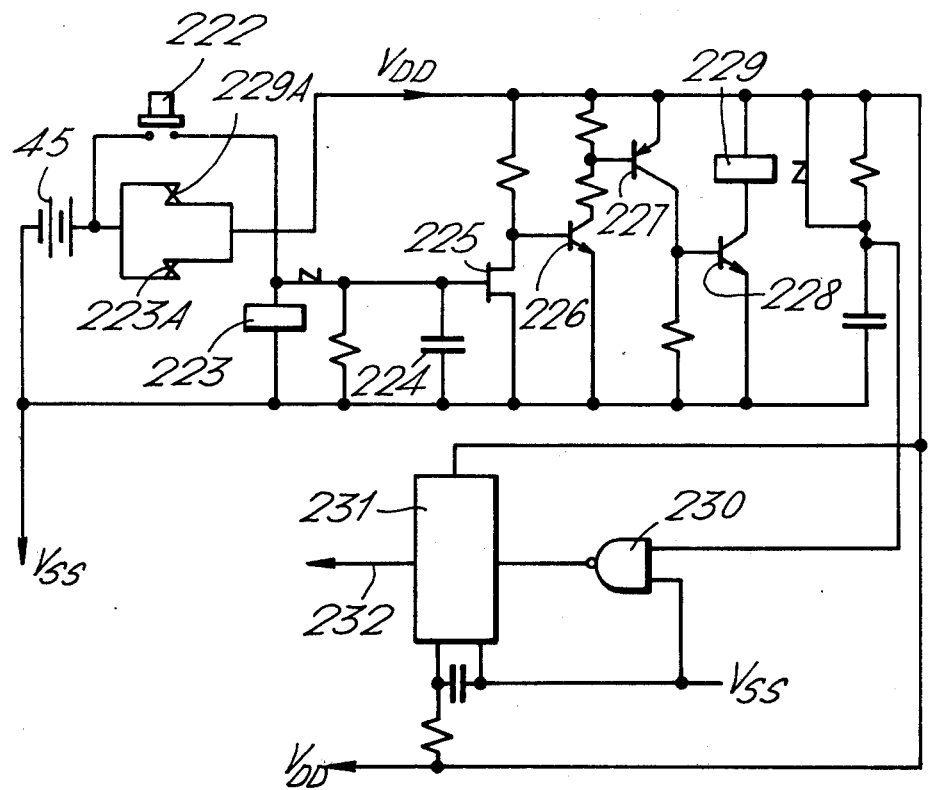

An embodiment of the invention will now be described with reference to the accompanying drawings which are as follows:

FIG. 1 is a front view of an instrument constructed in accordance with the present invention in which certain parts have been broken away to show the internal mechanism, FIG. 2 is a section on line II—II of FIG. 1, FIG. 3 is a section on line III—III of FIG. 1, FIG. 4 is an enlarged fragmentary view in the direction of arrow R shown in FIGS. 1 and 3, FIG. 5 is a block diagram showing the electronic circuitry of the instrument, and FIGS. 6A, 6B and 6C show the detail of this electronic circuitry.

The measuring device shown in FIGS. 1, 2, 3 and 4 is designed for taking either inside or outside measurement. It has a fixed anvil 10 and a movable anvil 11 and the measurements are taken across these anvils with inside measurements being taken at A across the outsides of the anvils and outside measurements being taken at B across the insides of the anvils.

When an operator wishes to measure a dimension with the instrument he will first of all have some idea of approximately what that dimension will be and he can position the movable anvil 11 so that it is approximately spaced from the fixed anvil 10 at about the right distance. The anvil 10 is secured to the end of a bar 12 while anvil 11 can move along bar 12. Bar 12 consists of two portions, a bar portion 13 which carries the movable anvil 11, and a bar extension 14. The extension 14 is one of a series of six extensions of different lengths. Anvil 11 is movable over a range of about 1 cm relative to a carriage 15, whilst carriage 15 is movable in 1 cm steps along bar portion 13 over a total length of 30 cm along bar portion 13. The extensions 14 comprise a series having lengths of 30 cm, 60 cm, 90 cm, 120 cm, and 150 cm and 180 cm. Thus, if an operator wishes to take a measurement which he anticipates to be about 110 cms he selects and fits the third extension 14 having a length of 90 cm and can then move the carriage 15 over the range 90 to 120 cm. However, known that the dimension he seeks is about 110 cm (i.e. 20 cm more than 90 cm) he moves the carriage to a position about 20 cm from its minimum reading. This is easily facilitated because fitting the selected extension 14 causes the appropriate scale to appear in the reading window of the instrument and when the carriage is moved so that the window shows 110 cm the operator can lock the position of the carriage relative to bar portion 13. The movable anvil 11 then has a range of substantially 1 cm over which it can be moved relative to carriage 15 to match exactly the dimension required to be measured. The final position of anvil 11 relative to carriage 15 when the measurement is being taken is measured by electronic circuitry, which will be described in detail later, and this gives the measurement to three decimal places when considered in centimeters or to two decimal places when considered in millimeters.

In order to take the measurement, having first found the correct position of the carriage 15 and having locked the carriage in this position, the operator presses button 222 and then engages the anvils 10, 11 with the workpiece. When he is satisfied that he has the anvils correctly positioned on the workpiece he releases button 222 and this freezes the electronic reading of the instrument for a period of about half a minute during which time the instrument can be removed from the workpiece and the reading recorded, irrespective of the fact that upon removal of the instrument from the workpiece, anvil 11 will travel to one end of its movement relative to carriage 15 under its spring bias.

Anvil 11 and Carriage 15

As previously mentioned the carriage 15 can be moved along bar portion 13 in 1 cm steps. The carriage can be locked in position by engagement of a taper ended plug 18 in any one of a series of holes 19 which are arranged at a pitch of 1 cm in the top edge of the bar portion 13 Thus when taking a measurement the engagement of plug 18 in a hole 19 aligns window 17 with an engraving on a bar 16 to provide the three most significant figures of measurement. The three least significant figures are provided by an electronics circuit which measures the relative position of anvil 11 with respect to carriage 15. The details of this circuit will be explained later.

Carriage 15 comprises an enclosure 20 mounted on a frame 21 which is capable of being slid along bar portion 13. Frame 21 is carried on bar portion 13 on inclined opposed surfaces 22 of a top flange 23 of bar portion 13.

Plug 18 is movable vertically as shown in FIG. 1. It carries a cross-head pin 24 which is engaged by a lever 25. The lever 25 is pivoted to enclosure 20 and connected at its other end to a plunger 26. The plunger 26 can be pushed downwards (as seen in FIG. 1) to disengage plug 18 from slot 19 against the pressure of a spring (not shown). In the position shown, with plug 13 engaged in a slot 19, plunger 26 can be rotated to cause a cam surface 27 to urge plug 13 securely into the selected hole 19 thus positioning carriage 15 firmly.

The movable anvil 11 is mounted by means of opposed cross roller bearings 30 (FIG. 3) on base 21 of carriage 15. The bearings 30 comprise a row of rollers in which adjacent rollers along the row have their axes disposed mutually perpendicularly (when viewed end on). Such a bearing arrangement gives a very low friction movement to anvil 11. Depending upon whether an inside or outside measurement is required, anvil 11 is biassed to the left or to the right as shown in FIG. 1 by means of a spring 31 the lower end (as seen in FIG. 1) of which is secured to base 21 while the other end of the spring is coiled about a pin 32 and engages a slot 33 (see FIG. 1) in pin 32. Rotation of pin 32 can change the bias of spring 31 to urge anvil 11 either to the left or to the right. This is brought about by the connection of the pin 32 to a handle 33' (FIG. 3) which has a knob 34 to which is secured a locating pin 35. In FIG. 1 the cover plate which carries handle 33' has been removed but the two alternative locations for pin 35 are indicated at 36 and 37. These are provided by holes in the cover plate. The handle 33 can be swung through about 320° between positions 36 and 37 thus winding up spring 31 in one direction or the other.

FIG. 3 shows a section through position 36 with the cover plate attached and this shows that when pin 35 is engaged in this position it contacts and actuates a microswitch 250 (FIG. 3 and also shown in FIG. 6B) causing the electronic circuit to correspond to the biassed end position of anvil 11. When knob 34 is pulled out and moved through about 320° to position 37, engagement of pin 35 again actuates microswitch 250 but this time closes its "INSIDE" measuring contact. The significance of these contacts will be explained later.

The use of the long armed spring 31 ensures a constant spring pressure over the range of movement of anvil 11 and ensures that errors due to variations in the pressure of contact with the workpiece are avoided.

The anvil 11 carries graticule 101 (see also FIG. 6A). A disc 40 carries for small graticules 102 to 105 and four photo-electric detectors 110 to 113 and these are secured to base 21 as are four light emitting diodes 106 to 109 carried on a disc 41 which is disposed on the further side of graticule 101 from disc 40. The function of the graticules, detectors and diodes will be described later.

The carriage 15 includes electronic circuitry which is mounted on circuit boards 42,43,44 and powered by a battery 45.

Bar 12

Bar 12 comprises two parts, namely bar portion 13 and one of the series of extension 14. Bar portion 13 is made of steel and is constructed with top flange 23 and a bottom flange 46 which extend perpendicularly of a central web 47. The extensions 14 are made of carbon fibre and have a conventional I-shaped cross-section. The use of carbon fibre makes the instrument light enough for one operator to use and carry conveniently even when all the extensions 14 are employed. It also prevents the contact of an operator's hand from causing a temperature error in a measurement. This is because the operator will handle extensions 14, which being made of carbon fibre have virtually zero temperature expansion coefficient. The operator's hands will also contact bar portion 13 but as this is relatively short particularly when the longer extensions 14 are employed, temperature errors will be negligible. Also most of the operator's hand contact will be with enclosure 20 and this will not affect the accuracy of the reading.

The action of fitting the chosen extension 14 to portion 13 causes the hexagon bar 16 to be rotated so that an appropriate one of its faces, which all carry engraved scales, aligns with the window 17 on carriage 15. The hexagonal bar 16 can be seen in cross-section in FIGS. 2 and 3; it extends the length of portion 13. Bar 16 is rotated by means of a pinion secured to its end which is engaged by a rack on extension 14 as the extension is fitted to portion 13. Each different extension 14 rotates bar 16 by a different amount so that the appropriate scale aligns with window 17. The hexagonal bar 16 is spring biassed into the minimum scale reading position. As mentioned above the largest extension 14 is 180 cm long and with the additional 30 cm from bar portion 13 this gives a maximum reading for the instrument of 210 cm.

Electronic circuit

As shown in FIG. 4 the position of the carriage 15 in relation to bar portion 13 is shown at the window 17. In FIG. 4, by way of example, the number "110" appears showing that the carriage 15 is 110 cm away from the fixed anvil 10. The three least significant figures "4.36" shown in the window 17 in FIG. 4 are provided by the circuit shown in FIGS. 5 and 6 and together with the position of carriage 15 e.g. 110 cm, give a measurement of 1104.36 mm across the two anvils.

General description of electronic circuit

Reference is now made to FIG. 5. The relative movement between anvil 11 and carriage 15 is detected at a Moire fringe device 100. In this device light passing through the graticule 101 causes photodetectors 110 to 113 (FIG. 6) to produce sinusoidal output voltages as the fringes pass. These voltages are changed to square waves and pass along lines 118, 119 to a detecting circuit 120 which detects the direction of movement of anvil 11 from the incoming waveforms and passes a "count-up" or "count-down" instruction along line 127. The circuit 120 also produces a pulsed waveform as the counting pulse passes along line 131 to a first counter 140.

The counter 140 records a count of "one" for each 1/100 mm of movement at the Moiré fringe device 100. When it counts to "ten" a count of "one" is passed to a counter 150 which counts "one" for each 1/10 mm. Similarly, a counter 160 receives a count of "one" when counter 150 reaches a count of "ten" and counter 160 therefore counts "one" for each whole millimeter. The count existing on each of counters 140, 150 and 160 is continuously transmitted to respective decoders 170, 180, 190. From there they are transmitted to a light emitting diode (LED) display 205 which shows millimeters, tenths of millimeters and hundredths of millimeters on three LED's. The LED displays comprise seven segment indicators and in order to save current the segments are supplied with a pulsed input from an oscillator 210. The input from circuit 210 is multiplexed successively to each of the LED devices. The inputs from decoders 170,180,190 activate those segments of the LED devices which are required in order to display the numerals corresponding to the counts existing on the counters and so a lesser number than seven of the segments of the LED devices will be receiving active pulses at any one time (depending upon the numeral being displayed); thus current is saved by only drawing pulses of current for those segments in use. The pulse repetition rate of circuit 210 does not have to be precise providing it is more than the rate of the persistence of human vision and a rate between 50 and 300 Hertz can conveniently be used.

It has been found in practice that taking a measurement close to one end of the 1 centimeter lengths defined by the holes 19 can give rise to time-wasting. For example, the operator may judge that a dimension just requires the carriage 15 to be moved out to the next hole only to find when he has moved the carriage that the dimension is a few tenths of a millimeter too small. To avoid having to move the carriage back and to cover this situation in both directions of measurement there is provided one millimeter of overtravel at each end of the central 10 millimeters of measurement provided by the movement of anvil 11 relative to carriage 15 and this overtravel is also measured by the electronic circuit and the Moiré fringe device 100.

Therefore the range of the Moiré fringe device 100 is 12 mm. This encompasses the central 10 mm of measurement and 1 mm of overtravel on each end. When the counters 140,150,160 have counted to either end of the central 10 mm measurement and pass into the overtravel, they continue counting but give an indication by operating either light 240 or light 241. This gives a visual warning that an under scale or over scale reading is being taken and so enables the operator to add on or deduct properly.

Moiré fringe device 100

This device comprises a graticule 101 mounted on anvil 11, having light slits inclined in one direction and four small graticules 102,103, 104,105 mounted on base 21 of carriage 15, having light slits inclined in the opposite direction. The four small graticules are staggered a quarter of the pitch of the distance between the inclined light slits on graticule 101. Light is transmitted through the graticules from four light emitting diodes (LED's) 106,107,108,109 positioned one for each of the four small graticules, and the fringes emanating from interference between the fringe devices are detected by four photo-electric detectors 110,111,112,113 again one for each of the small graticules. Thus FIG. 6 is diagrammatic and does not show the actual disposition of the LED's small graticules and photoelectric detectors which is that LED's 106,107,108 and 109 project light through graticule 101 to pass respectively through graticules 102,103,104 and 105. However, detector 110 is aligned with the graticule 102, detector 111 with graticule 103, detector 112 with graticule 104 and detector 113 with graticule 105.

Because of the physical displacement or stagger of the small graticule 102 to 105 along graticule 101, the sinusoidal electrical signal produced at the detector 111 is 90° out of phase with the signal at detector 110. Similarly, the signal at detector 112 is 180° out of phase and that at detector 113 is 270° out of phase, from the signal at detector 110. The detectors 110 and 112 are connected so that their outputs are fed into an amplifier 114 while detectors 111 and 113 are connected so that their outputs are fed into an amplifier 115. Amplifiers 114 and 115 respond to and amplify the difference in the two wave forms they respectively receive. The outputs from amplifiers 114,115 are the respective combined sine waves amplified but with the signal from amplifier 114 90° out of phase with respect to the signal from amplifier 115. Those signals are fed into respective Schmitt triggers 116,117 which produce square wave outputs. The square wave output on line 118 is therefore 90° out of phase from the output on line 119.

The Moiré fringe graticules detect relative movement in both directions (that is to the left and to the right as shown in FIG. 1). Depending upon the direction of movement the output on line 118 will be either 90° in advance of or 90° behind the signal on line 119.

Detection Circuit 120

When anvil 11 moves in one direction relative to carriage 15 the square wave signal in line 119 is 90° in advance of the signal on line 118 and during the high or "1" voltage portion of the square wave pulse on line 119, line 119 will be supplying high or "1" voltage to input 1 of NAND gate 121 and to input 3 of NAND gate 122. 90° after the beginning of the high voltage portion of the square wave on line 119 the high voltage portion of the square wave on line 118 will appear and this will provide a high voltage at input 3 of NAND gate 121 but will supply a low voltage at input 1 of NAND gate 122 because it will be inverted by inverter 123 thus disabling NAND gate 122. The voltage at input 2 of NAND gate 121 will momentarily be high so that NAND gate 121 will be enabled. Differentiating circuit 124 will cause the voltage at input 2 to NAND gate 121 to appear as a spike and this will be transmitted to line 125 where it will be applied to NAND gate 126 and will appear on line 127 as a high voltage or "1" pulse, thus causing the counters 140, 150, 160 to accept "up" counts. Also the voltage on line 125 will be applied to NAND gate 128 as a counting pulse. The circuit comprising NAND gate 129 and unit 130 take the spike wave form pulse and delay it to ensure that the signal on line 127 has preceded it thereby ensuring a correct direction of counting, and at the same time lengthen it into a longer count pulse which is transmitted along line 131.

When anvil 11 moves in the opposite direction relative to carriage 15 the signal on line 118 precedes the signal on line 119 by 90° and the inputs including that from differentiating circuit 132 enable NAND gate 122 and NAND gate 133 causing a "0" voltage or count "down" instruction to be transmitted along line 127. The count pulse is similarly transmitted along line 131.

COUNTING CIRCUIT 140, 150 and 160

Each time a pulse travels along line 131 it records a count of "1" on counter 140. As explained above, depending upon whether a "1" or a "0" is appearing on line 127 counter 140 will count up or down. Counter 140 is arranged as a decade counter. NAND gate 141 is arranged to enable counter 140 when battery voltage is on and when it reaches a count of "10" it passes an enabling pulse to NAND gate 151 which causes the same count pulse from line 131 to register a count of "1" on counter 150. Similarly, when counter 150 reaches a count of "10" it sends an enabling pulse to NAND gate 161 and this causes a count of "1" to be recorded in counter 160.

Inverters 170,180,190, and Decoder 200

At all times the readings on counters 140,150,160 are transmitted in binary coded decimal to respective inverters 170,180,190. These transmissions are on respective lines 142 to 145, 152 to 155 and 162 to 165. The inversion of the signals is required in order to facilitate multiplexing of the oscillations from an oscillator 210 in a manner which will be described below. The signals inverted by inverters 170,180 and 190 are re-inverted at inverters 201 to 204 before entering decoder 200.

LED Display 205

Decoder 200 converts the signals which it receives into appropriate signals on seven lines for connection to the seven anodes of light emitting diodes 206 to 208. Each of the LED's 206 to 208 has a respective cathode and these are connected on lines 171,181 and 191 to inverters 170,180,190. LED 206 includes a permanently illuminated decimal point as the instrument is intended to be read out in millimeters.

Oscillator 210

This comprises a pair of inverters 211 and 212 connected with resistors 213 and 214 and capacitor 215 to provide free running oscillation into a counter 216. Counter 216 is a decade counter with its first, third and sixth outputs connected respectively to inverters 190,180 and 170. In this way three out of ten pulses from the oscillator 210 only are used, thus saving battery power. When the first output of counter 216 receives an oscillation pulse it applies it to inverter 190 which thus energises the cathode of LED 206 along line 191 causing activation of such of the seven anodes of LED 206 as are being energized at that moment. In the example shown four of the cathodes are being energized to mark out the numeral "4". The arrangement is such that the third and sixth outputs of counter 216 being connected to inverters 180 and 170 and having no pulse output for the moment, disable these inverters so that LED's 207 and 208 have none of their cathodes energized. When the oscillation reaches the third output of counter 216 inverter 180 and LED 207 are energized. Similarly, LED 208 is energized when the oscillation reaches the output of counter 216. In this way the LED's are illuminated to shown the three least significant figures of the instrument reading.

Overtravel and undertravel

As explained above the movement of anvil 11 relative to carriage 15 is biassed by spring 31 to the left or right as shown in FIG. 1 depending upon whether an outside measurement or an inside measurement is to be made. Also as explained the operator selects the direction to bias by positioning knob 34 and this actuates micro switch 250. The closing of micro switch 250 in one or other of its positions causes an initial reading to be fed into counter 160 along with the zero readings appearing on counters 150 and 140.

If the anvil 11 is biased to the left as shown in FIG. 1 to take an outside reading, as the instrument is offered up to the workpiece and before the anvils contact the workpiece, anvil 11 will move under its spring bias not only to the left hand end of the central 10 mm of measurement but on to the end of the 1 mm of over travel. A mechanical stop (not shown) aligns anvil 11 in this end position. When switch 222 is then closed zero readings appear on counters 140 and 150 and a reading of "9" appears on counter 160. In addition LED 241 lights up and this shows that a measurement in the undertravel is being taken. As the anvil 11 contacts the workpiece and is driven to the right as seen in FIG. 1 the LED display 205 counts upwards from "900" and at the end of the 1 mm overtravel it records "000" and LED 241 is extinguished.

Similarly, if anvil 11 is biassed to the right as seen in FIG. 1 the other contact of switch 250 causes a bias to be applied to counter 160 so that a reading of "100" appears on LED 205 and LED 240 is illuminated.

For any measurement taken in the central 10 mm of measurement the reading can be read off directly. However, if the instrument is reading in the 1 mm of undertravel and has for example a reading of "921" on the LED display 205 with a reading of "142" appearing as the three most significant figures from the scale on hexagonal bar 16, the operator has to interpret this reading as 1419.21 mm. Similarly, in the 1 mm of overtravel a reading of "043" on the LED display combined with a hexagonal bar reading of "137" has to be interpreted as 1380.43 mm.

Battery Circuit 220

This circuit is shown in FIG. 6C. Battery 45 is not connected until switch 222 is closed. This is done by the operator when he wishes to take a reading and he needs to keep his finger on switch 222 to maintain it closed whilst he is taking a reading. When he is satisfied that he has the anvils correctly positioned on the workpiece he releases switch 222 and the reading existing at that time on the LED display 205 will be maintained for about half a minute.

Depression of switch 222 energises relay 223 which closes the normally open contacts 223A of relay 223. This supplies battery voltage as voltage $V_{DD}$ to all the lines so marked in FIG. 6 thus connecting battery power to the whole of the electronics circuit shown in FIG. 6. The lines marked $V_{SS}$ are permanently connected to battery return. Current changes up capacitor 224 and flows to FET 225 and transistors 226,227 and 228, thereby energising relay 229 and closing the normally open contacts 229A of relay 229. Voltage $V_{DD}$ is thus applied to NAND gate 230 and to inverter 231 causing a voltage output on line 232 (see also FIG. 6B) which is applied to counters 140,150,160. The signal on line 232 causes counters 140 and 150 to return to "0" and it causes counter 160 to return to "1" or "9" depending upon which contact of switch 250 is closed. Contact 229A (FIG. 6B) is closed upon closing switch 222 and this supplies battery voltage to NAND gates 141,151,161 thereby enabling counters 140,150,160 to accept count pulses. When switch 222 is opened contact 229A is opened immediately thus freezing the reading then existing on counters 140,150,160.

When switch 222 is released relay 229 immediately de-energises but relay 223 is maintained with switch 223A closed during the time taken for capacitor 224 to discharge. This takes about half a minute and when the voltage across the capacitor 224 is decayed to a level such that relay 223 opens its contact 223A, battery 45 is disconnected entirely. The arrangement for using the battery ensures that errors are not imported when the battery is removed for replacement. Also, the instrument will not suffer from cumlative errors of any kind and will only need to have its end overtravel and undertravel positions checked from time to time to ensure complete accuracy.

LED's 240,241

When the counter 160 reaches either end of its central 10 mm of measurement and starts to count in the 1 mm of overtravel, NAND devices 242 and 243 cause either transistor 244 or 245 to energize LED 240 or 241 respectively. These devices are illustrated in FIG. 6 as lying alongside LED 206 but their physical disposition in the instruments is actually one above and one below LED 206 to indicate to the operator an overcount or an undercount so that the operator can make an appropriate compensation to the reading as explained above.

We claim:

1. An instrument for measuring linear dimensions comprising:
    a pair of anvils for contacting a work piece across a dimension to be measured;
    a longitudinal bar extending the length of the instrument;
    a first of said anvils being secured to said bar;
    a carriage member movable along said bar;
    detent means operatively positioning said carriage on said bar at any one of a series of equally spaced positions along said bar, said positions corresponding to units of measurement relative to said first anvil;
    a second of said anvils being mounted on said carriage for movement parallel to a longitudinal length of said bar over a distance of at least one of said units;
    a first means provided for indicating the position of said carriage relative to said first anvil
    a second means for indicating the position of said second anvil relative to said carriage, said second means being electronically operable, said first means and said second means being in said units of measurement and having the indicating portions thereof juxtaposed to provide a composite indication of measurement;
    said longitudinal bar comprising a first portion on which said carriage is movable over a first range of said units of measurement, and a series of extension portions, each capable of being detachably secured respectively to the first portion of said bar and to said first anvil whereby said first anvil is capable of being positioned at any one of a series of different distances from said first portion dependent upon the one of said extension portions used to give the instrument a facility to measure a series of different ranges of said units of measurement.

2. An instrument as claimed in claim 1, including adjustable spring means for selectively biassing the second anvil, alternatively towards one end or towards the other end of its movement relative to the carriage whereby the operator has the facility to select the direction of this bias depending on whether an inside or an outside dimension is to be taken.

3. An instrument for measuring linear dimensions comprising:
    a pair of anvils for contacting a work piece across a dimension to be measured;
    a longitudinal bar extending the length of the instrument;
    a first of said anvils being secured to said bar;
    a carriage member movable along said bar;
    detent means operatively positioning said carriage on said bar at any one of a series of equally spaced positions along said bar, said positions corresponding to units of measurement relative to said first anvil;
    said longitudinal bar comprising a first portion on which said carriage is movable over a first range of said units of measurement, and a series of extension portions, each capable of being detachably secured respectively to the first portion of said bar and to said first anvil whereby said first anvil is capable of being positioned at any one of a series of different distances from said first portion dependent upon the one of said extension portions used to give the instrument a facility to measure a series of different ranges of said units of measurement;
    a second of said anvils being mounted on said carriage for movement parallel to a longitudinal length of said bar over a distance of at least one of said units;
    a first means provided for indicating the position of said carriage relative to said first anvil, said first means for indicating the position of the carriage relative to the first anvil comprising a member carrying a series of scales and means for automatically selecting the appropriate scale, said selection means being operable upon securing the selected extension portion to the first portion of the longitudinal bar whereby the select the appropriate scale for the selected extension portion;
    a second means for indicating the position of said second anvil relative to said carriage, both of the indications of said first means and said second means being in said units of measurement to thereby indicate the dimension to be measured in a form of a composite indication.

4. An instrument as claimed in claim 3, wherein the means for indicating the position of the second anvil relative to the carriage comprise a transducer for producing an electrical signal defining said position and an arrangement for displaying numerals corresponding to said position and means for energising a display of said numerals from said signal.

5. An instrument as claimed in claim 4, wherein the selected one of said scales provides the three most significant figures of the composite indication and the numerals displayed provide the three least significant figures of the composite indication.

6. An instrument as claimed in claim 5, wherein the second of said anvils has a range of movement relative to said carriage comprising a distance of one of said units of movement with an overtravel at each end of less than one of said units of measurement.

7. An instrument as claimed in claim 6, including adjustable spring means for selectively biasing the second anvil, alternatively towards one end or towards the other end of its movement relative to said carriage and means for setting the numeral display to an initial reading corresponding to one or other of the end positions of the range of movement of said second anvil relative to said carriage, depending upon the direction of bias selected.

8. An instrument as claimed in claim 7 including means for retaining a measurement on the numeral display for a period of time after taking the measurement to enable the instrument to be removed from the workpiece and the measurement recorded.

* * * * *